United States Patent

[11] 3,583,252

| [72] | Inventors | William M. Shipitalo<br>Scottsdale, Ariz.;<br>Norman F. Jirousek, Cleveland, Ohio |
|---|---|---|
| [21] | Appl. No. | 867,581 |
| [22] | Filed | Oct. 20, 1969 |
| [45] | Patented | June 8, 1971 |
| [73] | Assignee | TRW Inc.<br>Cleveland, Ohio |

[54] ROLLER GEAR DRIVE PRELOADING DEVICE
12 Claims, 6 Drawing Figs.

[52] U.S. Cl. .................................................. 74/399,
74/211, 74/801
[51] Int. Cl. ..................................................... F16h 35/06,
F16h 13/10, F16h 1/28
[50] Field of Search ........................................... 74/402,
399, 208, 211, 798, 801

[56] References Cited
UNITED STATES PATENTS
2,703,497  3/1955  Townsend ..................... 74/399
3,190,148  6/1965  Flichy ............................ 74/211X
3,216,270  11/1965  Nasvytis ....................... 74/801X Primary Examiner—Leonard H. Gerin
Attorney—Hill, Sherman, Meroni, Gross & Simpson ABSTRACT: A planetary or epicyclic gear system utilizing a ring gear, a sun gear and inner and outer intermediate gears disposed between the sun gear and the ring gear with the outer set of intermediate gears being positively positioned in an equal angular spaced relationship to the ring gear and sun gear. To compensate for variations in the load condition of the gear system and variations in the temperature conditions, the outer set of intermediate gears are mounted by eccentric bearing means so that the axis of rotation of each of the intermediate gears can pivot in the eccentric bearing means to adjust for changes in conditions imposed on the gear means to prevent jamming of the gears. In the preferred embodiment the intermediate gear and sun gear are roller gears and are provided with coacting annular radial surfaces which are in sliding contact with each other as the gears are in meshing relationship to prevent axial shifting therebetween.

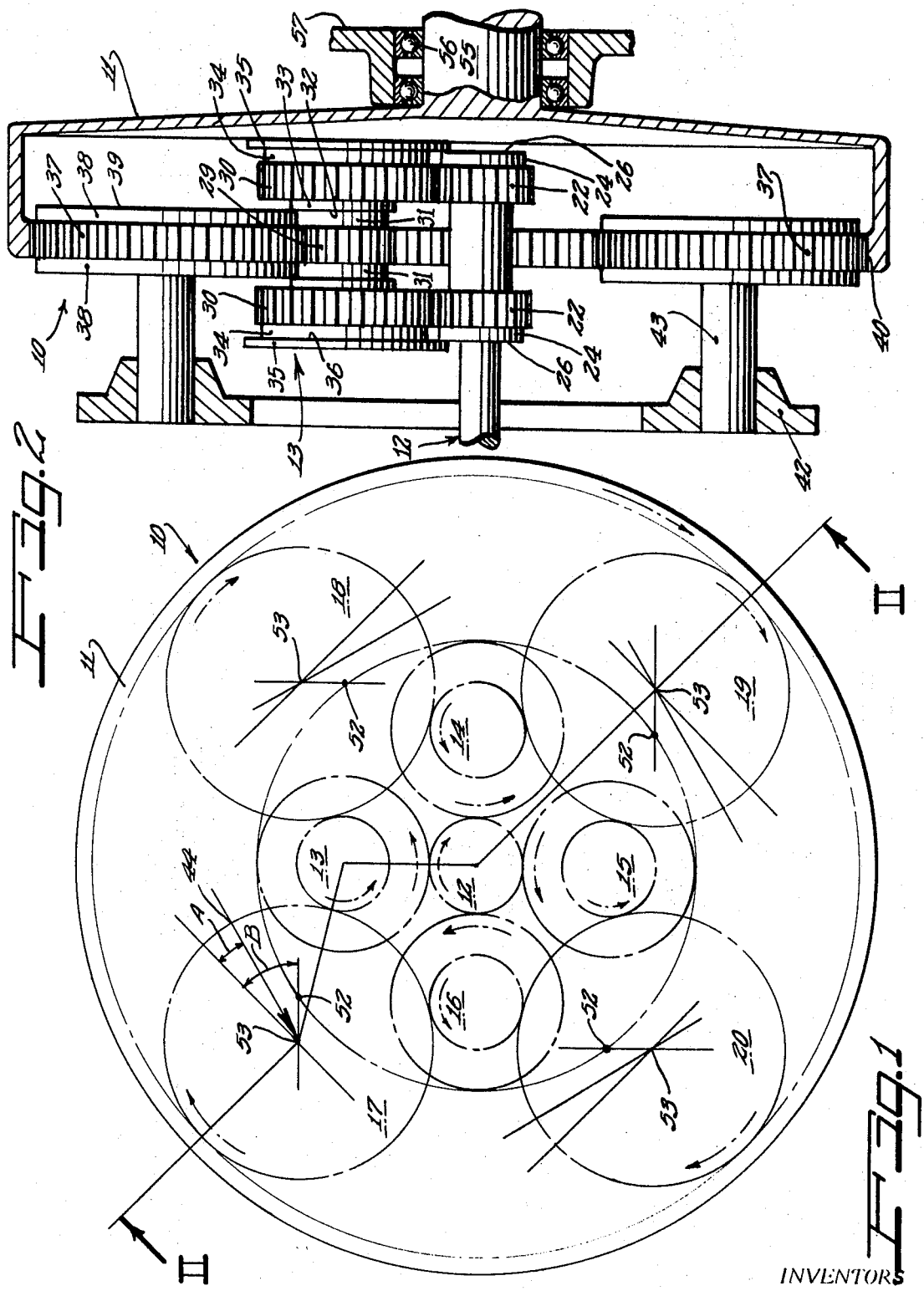

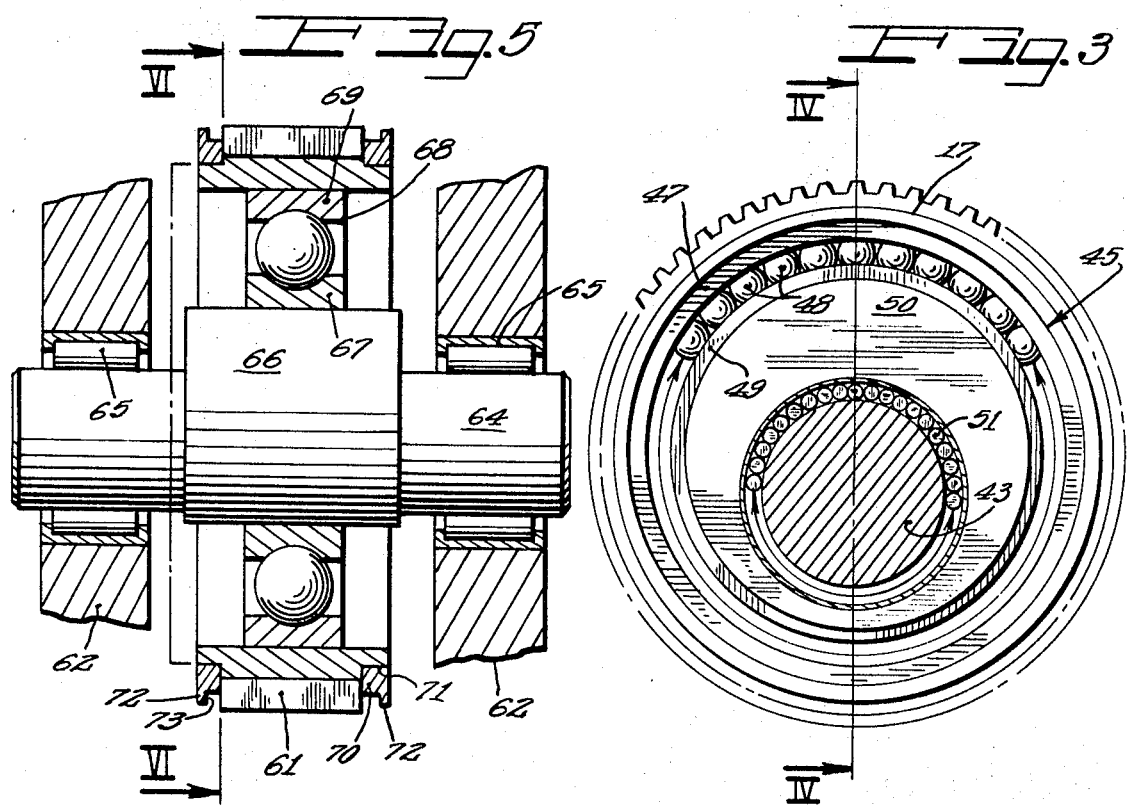
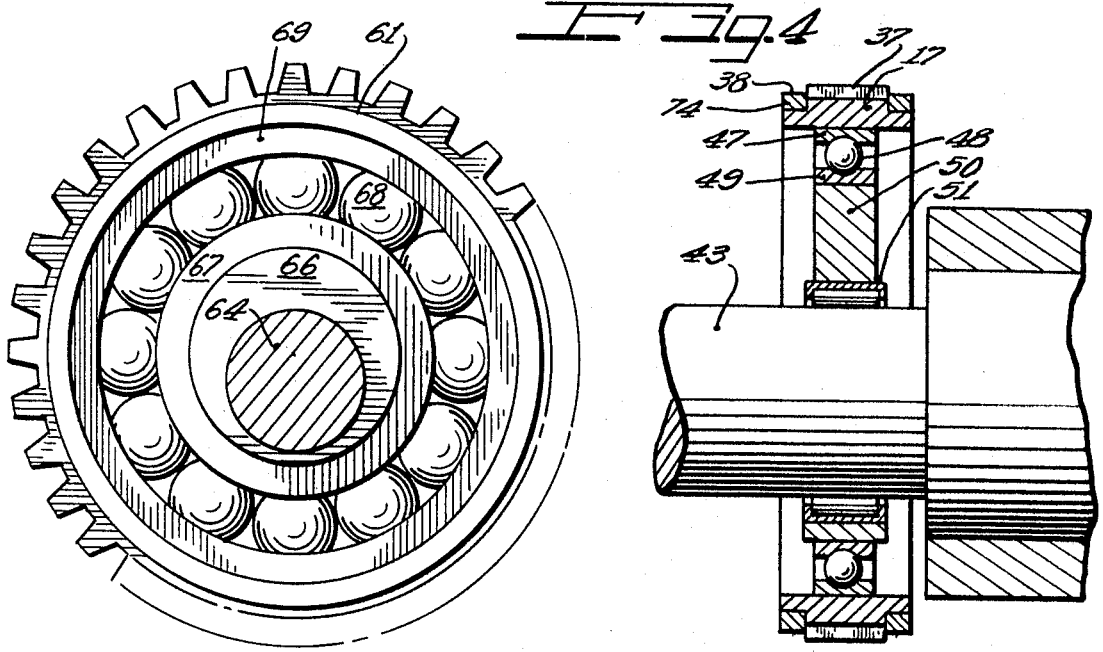

ROLLER GEAR DRIVE PRELOADING DEVICE

BACKGROUND OF THE INVENTION

1. Field of the Invention

The present invention is directed to a planetary or epicyclic gear system particularly one in which the intermediate gears and sun gears are roller gears.

2. Prior Art

In some of the presently known planetary or epicyclic drive gear systems, problems exist with load conditions and varying temperature conditions cause jamming of the meshing relationship between the gears of the system. For example, if the positioning means for a set of intermediate gears whether it is a stationary support or a rotatable spider has a different coefficient of expansion from the remaining elements of the drive system, temperature changes of the system will cause unequal expansion between the centers of the various gear elements and result in a binding of these elements. In a gear system employing roller gears, in which the meshing relationship between the various roller gears includes a preloaded rolling contact between the roller surfaces of respective gears, a resulting roller system force vector opposite to the direction of the output rotation of the ring gear will tend to unload the roller contact between the gears resulting in jamming. In a roller gear utilizing a sun gear, a first set of intermediate gears which are positioned by their engagement with a second set of intermediate gears without the benefit of bearings provided for the first set, an additional problem of preventing shifting of the gears in the direction of the axis of rotation can occur.

SUMMARY OF THE INVENTION

The present invention is directed to a gear system in which the positive positioning of an intermediate gear means employs an eccentric mounting to enable the center of rotation of the intermediate gear to pivot around the point of mounting to enable adjustments to compensate for changes in load and temperature conditions. The invention is also directed to providing means to restrain shifting along the axis of rotation of the gear elements to prevent jamming of the gears.

Accordingly, it is an object of the present invention to provide a gear drive system which compensates for variations in the load and temperature conditions to prevent jamming of the gear elements.

Another object of the present invention is to provide an epicyclic gear system utilizing mounting means for the intermediate gears enabling the center of rotation of the intermediate gears to move to a point of equilibrium in the system.

Yet another object of the present invention is to provide epicyclic gear systems utilizing roller gear elements in which a set of the intermediate gear means which are positively positioned are self-adjusting to maintain a predetermined load on the roller surfaces of the gears.

Other objects, features and advantages of the invention will be readily apparent from the following description of certain preferred embodiments thereof, taken in conjunction with the accompanying drawings, although variations and modifications may be effected without departing from the spirit and scope of the novel concept of the disclosure.

BRIEF DESCRIPTION OF THE DRAWINGS

FIG. 1 is a diagrammatic end elevation illustrating the arrangement of the gears of the drive system of the present invention;

FIG. 2 is a cross section taken along line II-II of FIG. 1 with portions in elevation for purposes of illustration of the structure of a gear system of the present invention;

FIG. 3 is an enlarged end elevation of an intermediate gear and its mounting means;

FIG. 4 is a cross section with parts in elevation for purposes of illustration taken along line IV-IV of FIG. 3;

FIG. 5 is a cross section with parts in elevation for purposes of illustration of an embodiment of the mounting means for an intermediate gear means of the present invention; and FIG. 6 is a view taken along lines VI-VI of FIG. 5.

As shown on the drawings:

Although the principles of the present invention are of utility in any gear system requiring compensation for changes in the load and temperature conditions, they are particularly useful when incorporated in a planetary or epicyclic gear system and the illustrative embodiments herein shown illustrate the novel structure utilized in a planetary or epicyclic drive system generally indicated at 10 in FIGS. 1 and 2. The drive system comprises a ring gear means 11 in driving relationship with a sun gear means 12 through intermediate gear means which are illustrated as a first set comprising gears 13—16 and a second set comprising gears 17—20.

In the embodiment illustrated in FIGS. 1 and 2, the sun gear 12 and the intermediate gears 13—20 are roller gears so that when they are in meshing relationship with one another, they have roller surfaces in rolling contact therebetween. The ring gear 11 is not provided with a roller surface and is only in meshing gear relationship with the second set of intermediate gears 17—20.

The sun gear 12 is illustrated as having split gear portions 22, 22 with roller surfaces 24, 24 of a diameter equal to the pitch diameter of the gear portion respectively associated therewith. The roller surfaces 24 each terminate in radially extending annular surfaces 26.

Intermediate gears 13—16 of the first set are stepped gears each having a small diameter gear portion 29 and a pair of large diameter gear portions 30, 30. Associated with the small diameter gear portion 29 is a pair of roller surfaces 31, 31 each of which has a radially extending annular surface 32 formed by an annular shoulder 33. The large diameter gear portions 30 each have a roller surface 34 which terminates in an annular flange 35 providing a radially extending annular surface 36. The roller surfaces 31 and 34 each have a diameter equal to the pitch diameter of their respective gear portions. The first set of intermediate gear means 13—16 are in meshing relationship with the sun gear 12 with the gear portions 30 engaging the split gears 22 and the roller surfaces 34 in contact with the roller surfaces 24 with the radially extending annular surfaces 32 and 36 in sliding engagement to maintain the axial alignment of the gear means 13—16 and to prevent axial displacement therebetween.

The second or outer set of intermediate gear means 17—20 have a single gear portion 37 having a pair of roller surfaces 38 of the diameter equal to the pitch diameter of the gear portion 37 and which roller surfaces 38 terminate in a radially extending annular surface 39. The second set of gear means 17—20 are each positively positioned in equal annular spacing about the sun gear means 12 and as illustrated in FIG. 1, the gear portion 37 is in meshed relationship with an internal gear 40 of the ring gear 11 and in meshed relationship with the small diameter gear portion 29 of the pair of adjacent intermediate gear means of the first set. As shown in FIG. 2, the roller surfaces 38 are in rolling engagement with the roller surfaces 31 associated with the small gear portion 29 of the intermediate gear of the first set and the annular radial surfaces 39 are in sliding engagement with the radial surfaces 32 to prevent axial movement between the gears. As best illustrated in FIG. 1, each of the gears 17—20 is engaged in a three-point engagement with the ring gear, and two of the intermediate gears in the first set. Thus, the gear 17 is in contact with the gears 13 and 16 by the action of the second set of intermediate gears, each of the intermediate gears of the first set are held in desired annular position around the sun gear means 12, for example the gears 17 and 18 of the second set hold the gear 13 of the first set in the desired position on the sun gear 12. As is well known in the art, the utilization of a stepped intermediate gear such as 13 enables the attainment of a higher reduction ratio in a one-plane gear system with a smaller overall diameter than if the step intermediate gear was not utilized.

In the system illustrated in FIGS. 1 and 2, the second or outer set of intermediate gears 17—20 are held in position by means of a stationary member 42 having mounting pins 43 for each of the intermediate gears of the second set. As mentioned above, a resisting torque to the motion of the gear system is developed in the gear drive system and is applied to the outermost set of intermediate gears along a force vector such as 44. The force vector 44 has both a radial component and a tangential component so that it tends to move the intermediate gear such as 17 away from contact with the intermediate gear 13 causing a jamming of the corresponding meshing gear portions. To compensate for this force, each of the intermediate gear means 17—20 of the second set is mounted with its axis of rotation being offset or eccentric to the axis of the mounting pin 43 by an eccentric mounting means 45. As best illustrated in FIGS. 3 and 4, each gear, such as 17, is mounted on an outer race 47 of an antifriction bearing 48. The inner race 49 is received on a member 50 which is a sleeve eccentrically mounted by a bearing 51 on the pin 43. Thus, the axis of rotation of the intermediate gears 17 is offset from the center of the pin 43 and thus rotation of the member or sleeve 50 about the pin 43 will pivot or rotate the axis of rotation of the intermediate gear 17 about the center of the pin 43.

As mentioned above, the force vector 44 has both radial and tangential components and forms an angle A with the tangent of the contact between the intermediate gear 17 and the ring gear 11. The center of the pin 43, which is diagrammatically illustrated at 52, is positioned on a line forming an angle B which is greater than the angle A. As illustrated in FIG. 1, the center 52 is disposed radially inward of the center 53 of the rotation of the intermediate gear 17 and is positioned clockwise thereto. Thus, the force vector 44 acting at the angle A causes the center 53 to pivot about the point 52 in a counterclockwise direction and this movement causes the center 53 to seek an equilibrium point to balance the reaction force vector 44 and maintain the desired preloading on the roller surfaces 31 and 38 of the respective intermediate gears of the first and second sets.

As mentioned hereinabove, the stationary ring 42 may be of a material having a different coefficient of expansion than the other elements of the gear drive system 10 such as the ring gear 11. Thus, an increase in the temperature environment of the gear drive system 10 would cause the support member 42 to expand at a different rate than the remaining gear elements and result in the application of forces causing jamming between the mesh gears. In the present gear system, the presence of an eccentric mounting means 45 enables the compensation for the different rates of expansion of the stationary member 42 which is relieved by the pivoting or rotation of the center 53 about the point 52. For example, if the stationary member 42 has a higher rate of expansion, the center 53 will rotate counterclockwise around the point 52 as the temperature increases.

The system 10 as described contemplates that the input to the system being applied to the sun gear means 12 and that the output be transmitted by the ring gear 11 through a shaft 55 which is journaled for rotation in bearing 56 of the housing 57. However, it may be desirable to have the input be applied to the shaft 55 and the output be taken from the center or sun gear means 12. Furthermore, the above-described mounting system need not be limited to the above-described gear drive system 10 for example the pins 43 may be attached to a rotatable spider which receives either the input or output and the ring gear 11 may be the stationary member of the system.

In the embodiment illustrated in FIGS. 5 and 6, an intermediate gear means 61 which is substantially similar to the gear means 17—20 of the gear system 10 is illustrated as being supported on each side of its axis by elements 62, 62 which may be arms of a rotatable spider. The positive positioning is obtained by a pin or shaft 64 which is rotatably supported in each of the members 62 by antifriction bearings 65. The pin 64 has an eccentric portion 66 which has a cylindrical surface with an axis that is offset from the axis of the pin 64. Supported on the surface of the eccentric portion 66 is an inner race 67 of an antifriction bearings bearing whose outer race 69 receives and supports the intermediate gear 61. Since the axis of the rotation of the gear 61 is coincidental with the axis of the eccentric portion 66 and both are offset from the axis of rotation of the shaft 64, the application of resulting force vector such as 44 or of the forces caused by the expansion of the members 66 is compensated by the rotation or pivoting of the axis of the gear 61 around the axis of the shaft 64 as the shaft 64 rotates in its bearing means 65. As in the embodiment illustrated and discussed hereinbefore, the axis of the pin 64 is offset at an angle to the center of rotation of the gear so that the application of the vector forces or forces caused by expansion can be relieved by the pivoting of the center of rotation of the intermediate gear means.

In order to provide roller surfaces of a diameter equal to the pitch diameter of the gear portion of the intermediate gear 61, rings 70 are applied in a groove 71. It is noted that the rings 70 are illustrated as having angular flanges 72 which provide a radially extending annular surface such as 73 to coact with the radial extending surfaces of the meshing gear. It is noted that in the system illustrated in FIG. 2, that the rings 70 would be smooth such as the rings 74 (FIG. 4) which are free of an annular flange.

In the system described hereinabove, the first set of intermediate gears 13—16 are free from bearing support and are maintained in their angular position by their three-way contact with the sun gear means 12 and two intermediate gears of the second set of intermediate gears 17—20. The application of forces such as the resulting force vector 44 or forces due to unequal thermal expansion could create a separation between the roller surface 38 and 31 of the respective gears which separation would enable jamming of the meshing gear portions 37 and 29. By the provision of mounting means which enable the center of rotation of the intermediate gear means 17—20 to rotate or pivot about an eccentric mounting point, the second set of intermediate gear means 17—20 will seek an equilibrium position in which roller surfaces are in contact with the desired preloading. It should be noted that if more than two sets of intermediate gears are utilized in the gear system, that the eccentric mounting of the invention should be employed in the set of gears which is positively positioned by the positioning means such as the stationary member 42 of the spider member 62.

We claim as our invention:

1. In combination a gear system comprising:
    a sun gear means,
    an intermediate gear means,
    a ring gear means,
    means for positioning said intermediate gear means in driving relationship with said sun gear means and in meshing relationship with said ring gear means,
    said positioning means including an antifriction bearing rotatably mounting said intermediate gear means and having an inner race mounted on a member rotatable about an axis eccentric to the axis of rotation of said intermediate gear means so that the axis of rotation of the intermediate gear means moves to compensate for changes in the temperature environment and loading conditions to prevent jamming of said gear means of the system.

2. In a gear system according to claim 1, wherein said positioning means is a rotatable spider means and said member is a pin having an eccentric portion, said pin being rotatably supported in said spider by an antifriction bearing.

3. In a gear system according to claim 1, wherein the center of rotation of the member is radially offset from the center of rotation of said intermediate gear means towards said sun gear at an angle to the tangent of contact between said intermediate gear means and said ring gear which is greater than resultant force vector of the gear system acting on the intermediate gear so that the center of the intermediate gear pivots about the center of the member to maintain the desired contact between the gears.

4. A gear system according to claim 1 wherein said member comprises a sleeve supporting the inner race of said friction bearing of said intermediate gear means, said sleeve being eccentrically mounted by frictionless bearing means on a pin attached to a fixed stationary support.

5. A gear system comprising a sun gear means, a ring gear means, a first set of intermediate gear means in meshing contact with said sun gear means, and a second set of intermediate gear means disposed outward of said first set and being in meshing relationship with said ring gear means, means positioning the intermediate gears of said second set in equal angular spacing with said ring gear means, each of said intermediate gears of said second set being in mesh relationship with a pair of the intermediate gears of the first set so that the intermediate gears of said second set hold the gears of said first set in the desired angular position with respect to said sun gear means, said positioning means including a member for each of the intermediate gears of said second set upon which the respective gear is mounted for rotation, said member being rotatable about an axis eccentric to the axis of rotation of its respective intermediate gear so that the center of rotation of the intermediate gear of the second set moves about the axis of said member to compensate for loading forces and temperature conditions of said gear system to prevent jamming of the meshing gears.

6. A gear system according to claim 5 wherein said member comprises a pin and a sleeve, said sleeve being supported for rotation on said pin and having an outer surface for receiving a frictionless bearing of the intermediate gear means which is eccentric to the axis of said pin so that said sleeve rotates about said pin as said intermediate gear means compensates for the loads and temperature conditions of the system.

7. A gear system according to claim 6 wherein the center of said pin is disposed inwardly toward the sun gear from the center of rotation of said intermediate gear of said second set, at an angle to a tangential line of contact between said intermediate gear and said ring gear which is greater than the angle of a resulting force vector of the system applied to said intermediate gear means.

8. A gear system according to claim 5, wherein said sun gear means, said intermediate gears of said first an second sets are roller gears having gear teeth and a roller surface of a diameter equal to the pitch diameter of said gear teeth, said gears being disposed in meshing relationship with the roller surfaces of the first set of intermediate gears in rolling engagement with the roller surfaces of said sun gear and with the roller surfaces of said second set of intermediate gears.

9. In a gear system according to claim 5, wherein said first set of intermediate gear means are step gears having open portions of different diameters and roller surfaces of a diameter corresponding to the pitch diameter of each of said gear portions, wherein said sun gear means has roller surfaces of a diameter equal to the pitch diameter of the sun gear means, and wherein said second set of intermediate gears have a gear portion and a roller surface of a diameter corresponding to the pitch diameter of said gear portion, said first set of intermediate gears having rolling contact with the roller portions of said sun gear and having the roller surfaces of a smaller diameter in contact with the rolling surfaces of said second set of intermediate gears.

10. A gear system according to claim 5, wherein said sun gear and said first and second sets of intermediate gears are roller gear means having roller surfaces of a diameter equal to the mean diameter of said gear teeth, each of said roller gear means having a pair or radially extending surfaces, said sun gear being in meshing relationship with said first set of intermediate gear means with said roller surfaces in contact therewith and said radially extending surface in sliding engagement therewith to prevent axial movement therebetween and said first and second set of intermediate gear means being in engagement with said roller surfaces being in rolling contact and said radially extending surfaces in sliding engagement to prevent relative movement in the axial direction of rotation between said first and second set of intermediate gear means.

11. In combination a gear system comprising sun gear means and a ring gear means, said sun gear means having a roller surface with a diameter equal to the pitch diameter of the gear teeth thereon, a first set of intermediate gear means angularly spaced about said sun gear means and having roller surfaces of a diameter equal to the pitch diameter of the gear teeth thereon, said first set of intermediate gear means being in meshed relationship with said sun gear means with said roller surfaces being in rolling engagement therewith, a second set of intermediate gear means having roller surfaces of a diameter equal to the pitch diameter of the gear teeth thereon, and means for positioning the second set of intermediate gear means in mesh relationship with the ring gear means and in engagement with the first set of intermediate gear means, each of said first set of intermediate gear means being in mesh relationship with at least two of the intermediate gear means of the second set, said mesh relationship including rolling contact between the roller surfaces of the respective gears, said means for positioning including eccentric bearing means for each of the intermediate gear means of the second set so that the center of rotation of each of the intermediate gear means of the second set is pivotable around the eccentric bearing means enabling radial movement of the intermediate gear means of the second set to compensate for load and temperature conditions of the gear system.

12. In a gear system including at least a pair of meshing gear means, each having teeth thereon in meshing relationship, each of said gear means including a cylindrical roller surface having a diameter equal to the pitch diameter of the teeth thereon, said roller surfaces being in rolling contact with each other as the gear means are in meshing relationship, the improvement comprising each of said meshing gear means having a pair of annular surfaces extending radially from said pitch diameter of said gear means, said pairs of annular surfaces coacting together to maintain the axial alignment between said meshing gear means.

UNITED STATES PATENT OFFICE
CERTIFICATE OF CORRECTION

Patent No. 3,583,252          Dated June 8, 1971

Inventor(s) William M. Shipitalo, Norman F. Jirousek

It is certified that error appears in the above-identified patent and that said Letters Patent are hereby corrected as shown below:

Column 3, line 74; "bearings bearing" should read --bearing 68--.

Column 4, line 30; "surface" should read --surfaces--.

Column 5, line 40; "first an" should read --first and--.

Signed and sealed this 20th day of February 1973.

(SEAL)
Attest:

EDWARD M. FLETCHER, JR.
Attesting Officer

ROBERT GOTTSCHALK
Commissioner of Patents